(12) United States Patent
Shevela et al.

(10) Patent No.: US 7,069,643 B2
(45) Date of Patent: Jul. 4, 2006

(54) FUEL SENDING UNIT LOCK RING TOOL

(75) Inventors: Michael Shevela, Harrison Township, MI (US); Richard Harry Krentz, Bloomfield Hills, MI (US); Kevin A. Willcock, Shelby Township, MI (US)

(73) Assignee: SPX Corporation, Charlotte, NC (US)

( * ) Notice: Subject to any disclaimer, the term of this patent is extended or adjusted under 35 U.S.C. 154(b) by 224 days.

(21) Appl. No.: 10/212,094

(22) Filed: Aug. 6, 2002

(65) Prior Publication Data

US 2004/0025316 A1    Feb. 12, 2004

(51) Int. Cl.
*B23P 19/00* (2006.01)
(52) U.S. Cl. ........................................................ 29/758
(58) Field of Classification Search .............. 29/426.1, 29/426.5, 443, 445, 464, 468, 758, 759, 764, 29/222, 235, 240, 243, 270; 81/121.1, 124.3, 81/124.4, 177.85, 124.2
See application file for complete search history.

(56) References Cited

U.S. PATENT DOCUMENTS

| | | | |
|---|---|---|---|
| 3,010,346 A * | 11/1961 | Kulp | 81/124.2 |
| 4,817,475 A * | 4/1989 | Kelley | 81/121.1 |
| 5,056,853 A * | 10/1991 | Van Order | 296/97.9 |
| 5,651,651 A * | 7/1997 | Spencer | 411/372.6 |

\* cited by examiner

*Primary Examiner*—John C. Hong
(74) *Attorney, Agent, or Firm*—Baker & Hostetler LLP

(57) ABSTRACT

A device and method for installing and removing fuel sending closure system lock rings for retaining a module reservoir assembly includes a drive connection feature and a plurality of legs having feet that engage the lock ring to rotate it.

20 Claims, 9 Drawing Sheets

FUEL SENDING UNIT LOCK RING TOOL

FIELD OF THE INVENTION

The present invention relates generally to the field of fuel sender closure systems used on fuel tank assemblies. More particularly, the present invention relates to a device and method for installing and removing a lock ring for a fuel sending closure system.

BACKGROUND OF THE INVENTION

Fuel sending closure systems are utilized for delivering fuel from a automotive vehicle fuel tank to additional fuel handling components such as a fuel injection device.

It is sometimes necessary to remove the fuel sending closure systems from its fuel tank connection point. Upon fixing any problems, it may also be expected that the fuel sending closure system be reassembled to the fuel tank. Reasons for removing the fuel sender closure system from the fuel tank may include, for example, the necessity to perform diagnostics tests or to remove contamination from the fuel tank at the interface location point.

The fuel sending closure system may be comprised of a five-part interfacing system including a tank groove, module reservoir assembly (MRA), seal, encapsulated ring, and lock ring. In an assembled state, the lock ring is utilized to couple and retain the MRA against the fuel tank assembly via a fuel tank coupling mechanism. To remove the MRA for servicing, the lock ring must be unlocked from the fuel tank coupling mechanism and removed.

It would be desirable to remove or install the lock ring using a tool that could meet one or more of several conditions, at least to some degree. Such conditions include sufficient strength of the tool to be able to rotate the lock ring into locked position in order to retain a MRA in place within allowable tolerances. Further, it would be desirable to have a tool sufficiently strong to unlock the lock ring in order to remove a MRA which is within a prescribed tolerance range. During an installation or removal process, it would be desirable for the tool to not damage the lock ring, fuel tank shell surface, or parts of the MRA including, for example MRA ports and connectors. In order to assist a service technician during removal or transport of the lock ring, it would be desirable for the tool to also have the ability to "capture" and retain the lock ring in a loose state. Finally, it would be desirable to have such a tool that would be able to withstand impact torques within prescribed tolerance ranges.

SUMMARY OF THE INVENTION

The foregoing needs have been met at least to some extent by the present invention, which in some embodiments may be used to remove or install lock rings for retaining module reservoir assemblies (MRA's) in fuel sender closure systems. Some preferred embodiments provide a tool design which is strong enough for removing or install lock rings while having clearance around key components of the MRA.

In accordance with one aspect of the present invention, a device is provided for removing or installing a lock ring. The device includes a base, a drive connection feature, and a plurality of legs extending downwardly and outwardly from the base. Each of the legs terminate in a respective end having a respective foot.

In another aspect of the invention, a method is provided for retaining a MRA by coupling a lock ring to a fuel tank shell having a plurality of coupling mechanisms. The method includes providing a tool comprising a base, a connection feature, and a plurality of legs extending downwardly and outwardly from said base. Each of the legs terminate in a respective end having a respective foot. The method further includes installing a MRA having a lip portion which abuts a fuel tank shell into an opening in a fuel tank shell. A lock ring comprising a plurality of notches, a plurality of cutouts, and a plurality of flanges is installed over the lip portion of the MRA. The plurality of coupling mechanisms attached to the fuel tank is installed through the cutouts. Each foot of the tool is inserted into a respective notch located on a lock ring in a load position. The tool is rotated in a clockwise direction to a first engaged unlocked position to cause each foot to abut an inner side surface of its respective notch. The lock ring is rotated by further rotating the tool in a clockwise direction to a first engaged locked position wherein the coupling mechanisms are locked onto flanges of the lock ring thereby retaining the MRA.

In another aspect of the invention, a method is provided for uncoupling a lock ring retaining a MRA from a fuel tank shell having a plurality of coupling mechanisms wherein the lock ring comprises a plurality of notches, a plurality of cutouts, and a plurality of flanges. The method includes providing a tool comprising a base, a connection feature, and a plurality of legs extending downwardly and outwardly from the base. Each of the legs terminate in a respective end having a respective foot. Each foot of the tool is placed into a respective notch located on the lock ring in a locked load position. The lock ring is rotated by further rotating the tool in a counterclockwise direction to a second engaged unlocked position wherein the coupling mechanisms are unlocked from flanges of the lock ring.

In another aspect of the invention, a device is provided for removing or installing a lock ring. The device includes a means for supporting a base, a means for connecting to the device, and a means for attaching the device to the lock ring.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 1:
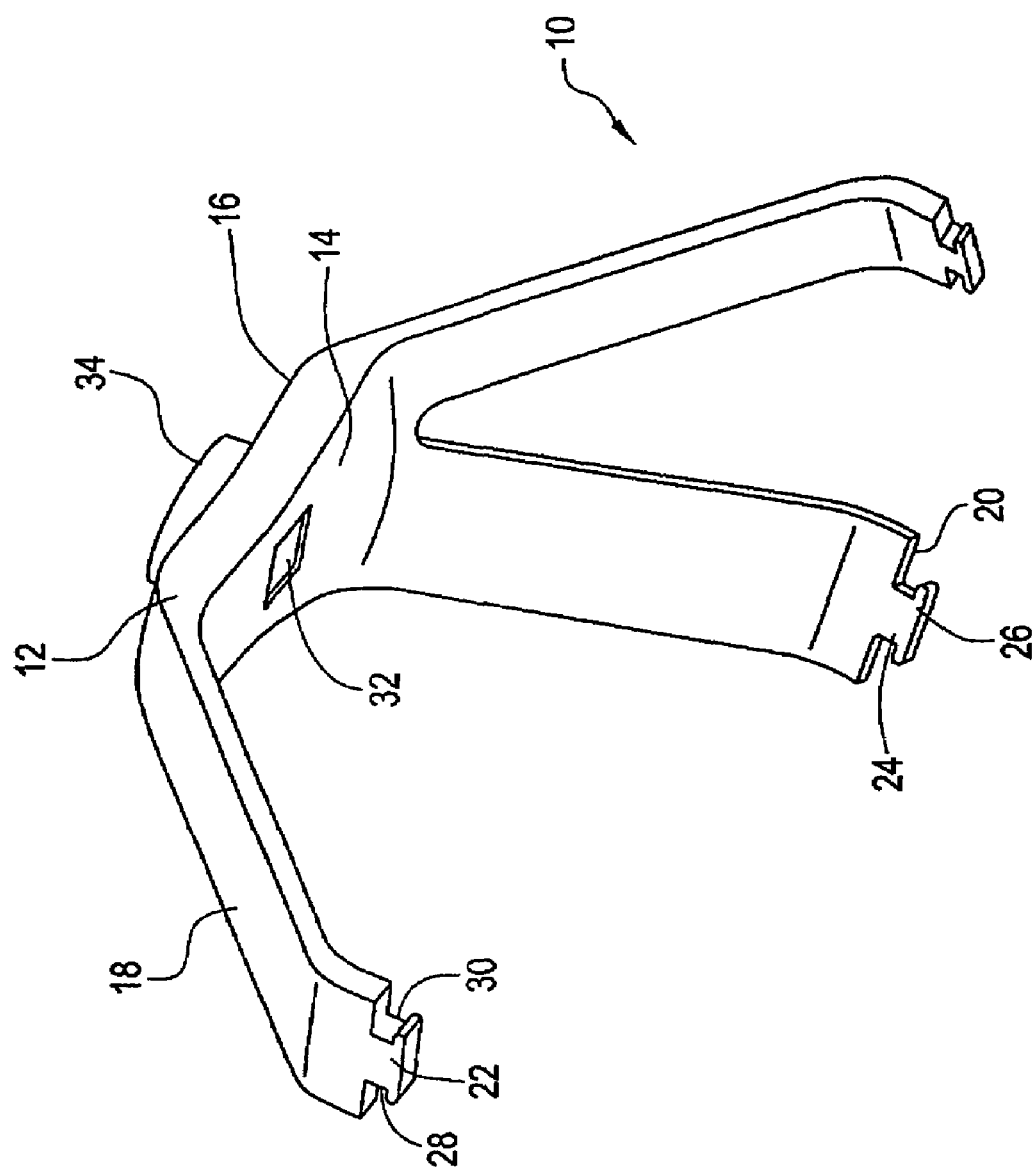
FIG. 1 is a perspective view of a tool for installing and removing lock rings in accordance with a preferred embodiment of the present invention.

The present invention provides a tool 10, as depicted in FIG. 1, for operating preferably as a three-tanged, or three legged, wrench which provides strength and clearance to remove and install fuel sending unit lock rings. The tool 10 includes a base 12 having inner and outer surfaces 14 and 16. A plurality of legs 18 extend from the base. In a preferred embodiment of the invention, three legs 18 extend outwardly and downward from the base 12 at an angle selected to clear and/or not damage any sub-components of the module reservoir assembly (MRA) such as tubes or connectors. While three legs 1B are preferred, the tool 10 can include any number of legs, including for example, two or four legs. Each of the legs 18 terminate at respective ends 20.

A respective foot 22 extends from each of the respective leg ends 20. Each respective foot is further comprised of a foot base 24 and a top head 26. The foot base 24 has a thinner width than that of the leg ends 20. The top head 26 is configured such that its width is wider than the width of the foot base 24. This configuration creates a first notch 28 and a second notch 30 in configuration on both sides of the foot base 24 and between the leg end 20 and a surface of the top head 26.

The tool 10 is preferably designed to have sufficient strength to endure high impact torques. While a preferred material of the invention may include heat treated steel, other materials suitable to generate a tool with sufficient strength to sustain high impact torque applications may be used. In this regard, the tool 10 is preferably designed to be capable of withstanding expected torque in use and may be for example designed to withstand a minimum of 500 ft/lbs. when applied to remove or install lock rings. During actual use, in some examples the expected torque required to torque the system together is anticipated to require up to 400 ft/lbs. at application rates of up to 30 degrees per second.

Figure 5:
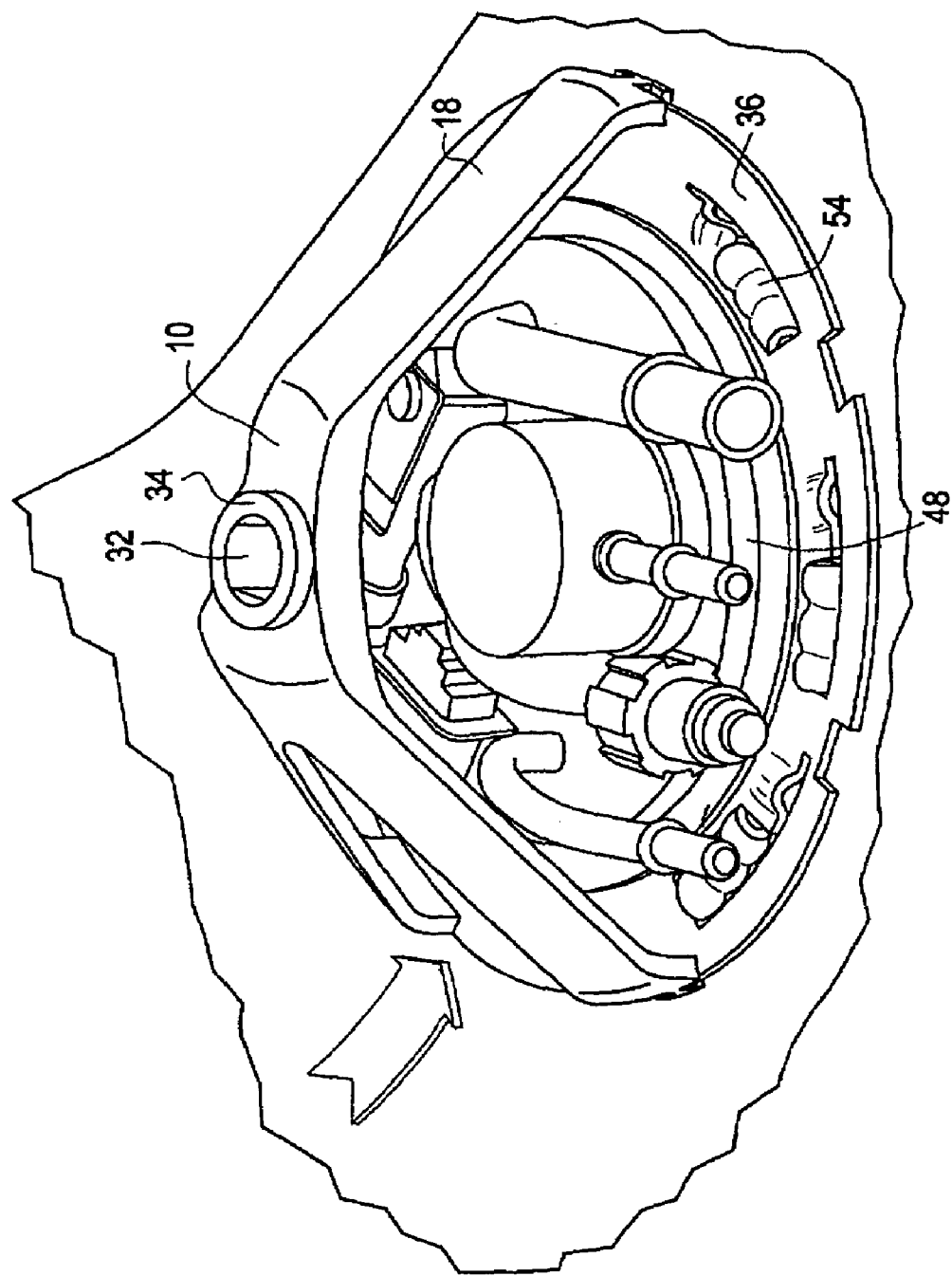
FIG. 5 is a perspective view of a tool in connection with a lock ring of a fuel sender closure system in an unlocked position with respect to a fuel tank assembly.
Figure 7:
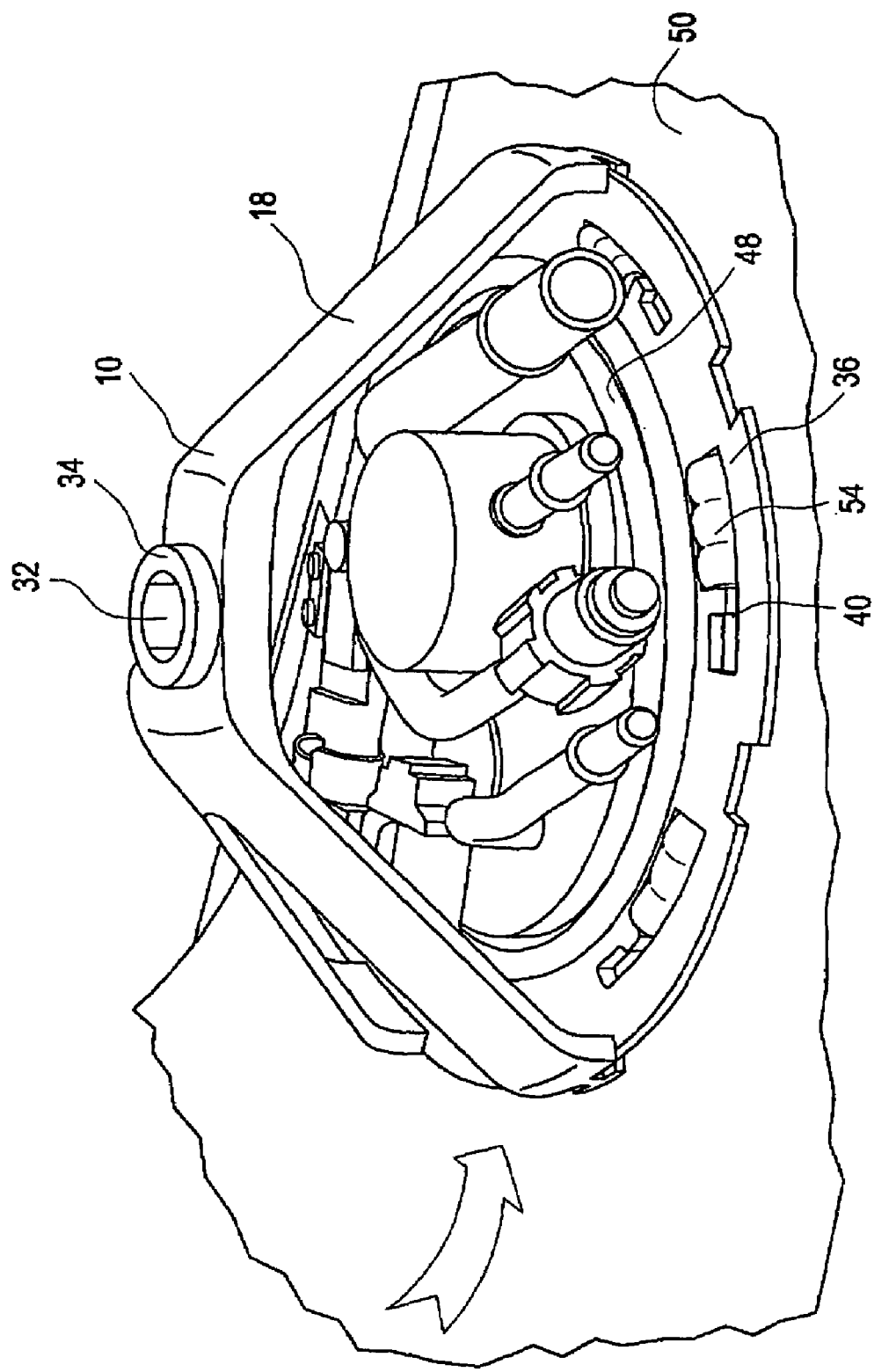
FIG. 7 is a perspective view of a tool in connection with a lock ring of a fuel sender closure system in a locked position with respect to a fuel tank assembly.

In order to generate enough torque to the tool 10 for removing a lock ring, the tool 10 is designed to include a drive connection feature such that an additional device may be attached to it. The connected device will allow an operator to apply torque to the tool 10 to rotate it about an axis of the tool 10 causing the tool 10 to rotate. In one preferred embodiment of the invention, the drive connection feature comprises a wrench connection opening 32 located on the base 12 to which a device such as a breaker bar, a manual wrench, or a power driver wrench, for example, may be connected. As best shown in FIGS. 1, 5 and 7, the connection opening 32 may be further designed in some embodiments to accommodate a square drive opening which will allow, for example, a ½" drive wrench to be connected to the tool 10 at the connection opening 32 location.

The tool 10 also includes a reinforcement feature to increase the strength of the tool design. In one preferred embodiment of the invention, the reinforcement feature comprises a stiffening ring 34 formed around the wrench connection opening 32. The stiffening ring 34 assists in uniformly transferring the applied loads (applied, for example, by a connected service wrench to the connection opening 32) into the legs 18 to distribute transferred load forces through the tool 10 to a connected lock ring.

As previously mentioned, the plurality of legs 18 terminate into respective ends 20 which further extend into respective feet 22. The feet 22 comprise a foot base 24 and a top head 26 to form a first notch 28 and second notch 30 in configuration on both sides of the foot base 24 and between the leg end 20 and a surface of the top head 26. The first and second notches 28, 30 are utilized to connect the tool 10 to the lock ring 36 in the manner described below.

Figure 2:
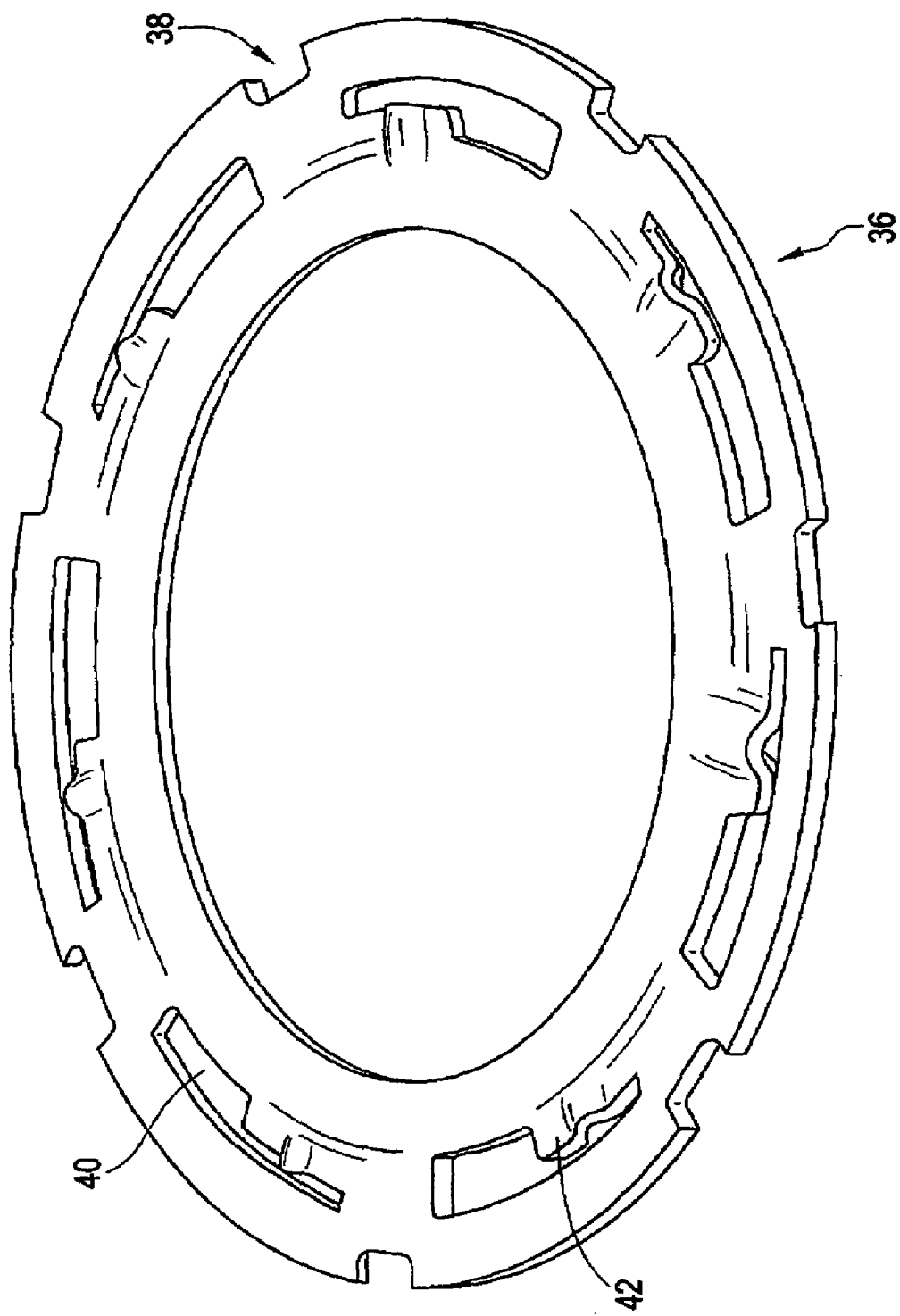
FIG. 2 is a top view of a lock ring utilized by the tool of FIG. 1.
Figure 3:
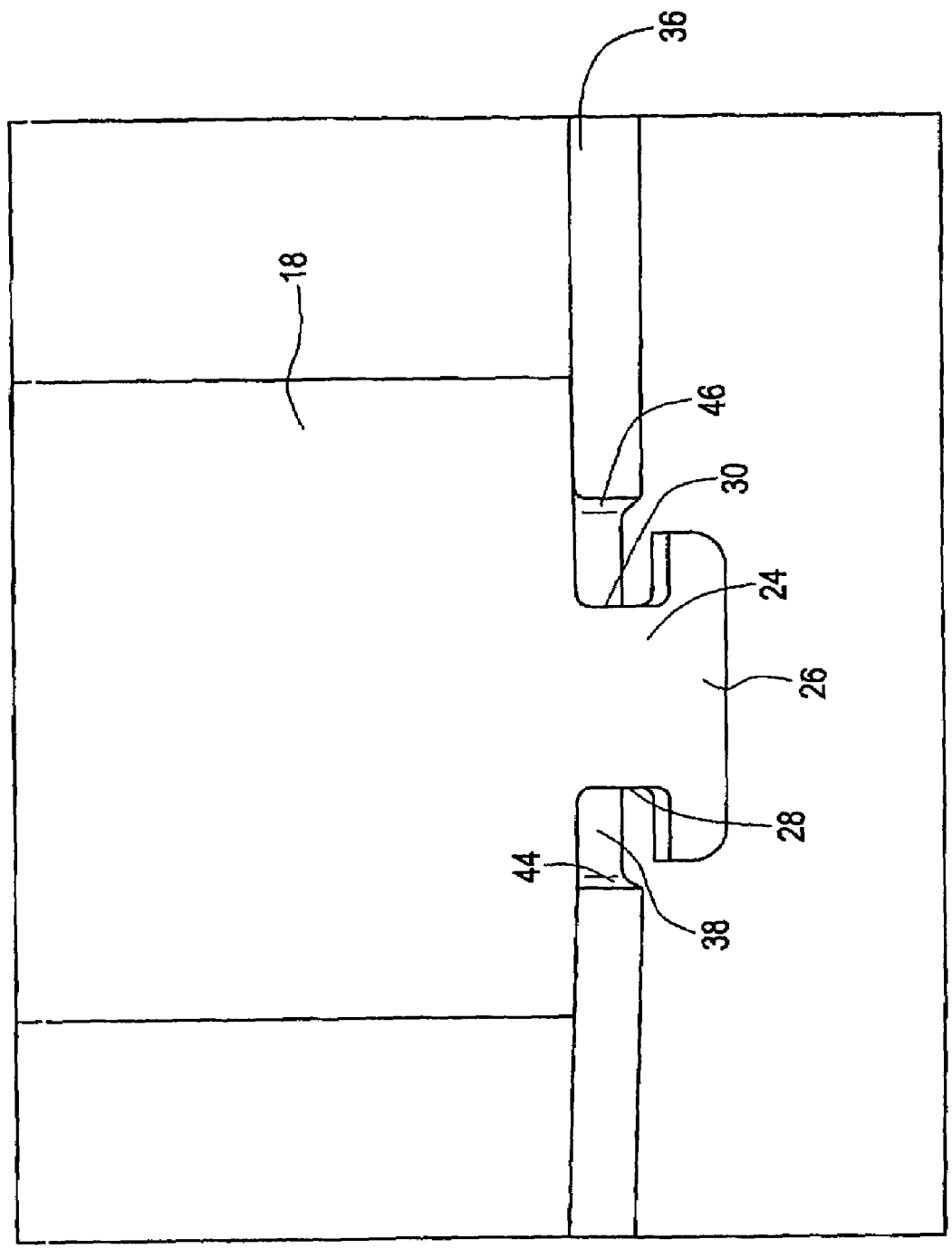
FIG. 3 is an enlarged view of the leg and foot of a tool in a load position with respect to a lock ring notch.

FIG. 2 shows a lock ring 36 with notches 38, cutouts 40, and retaining flanges 42. The tool 10 is designed such that the first notch 28 and the second notch 30 of the tool are capable of abutting either the left side wall 44 or the right side wall 46 of the lock ring notch 38, respectively, as depicted in FIG. 3.

Figure 4:
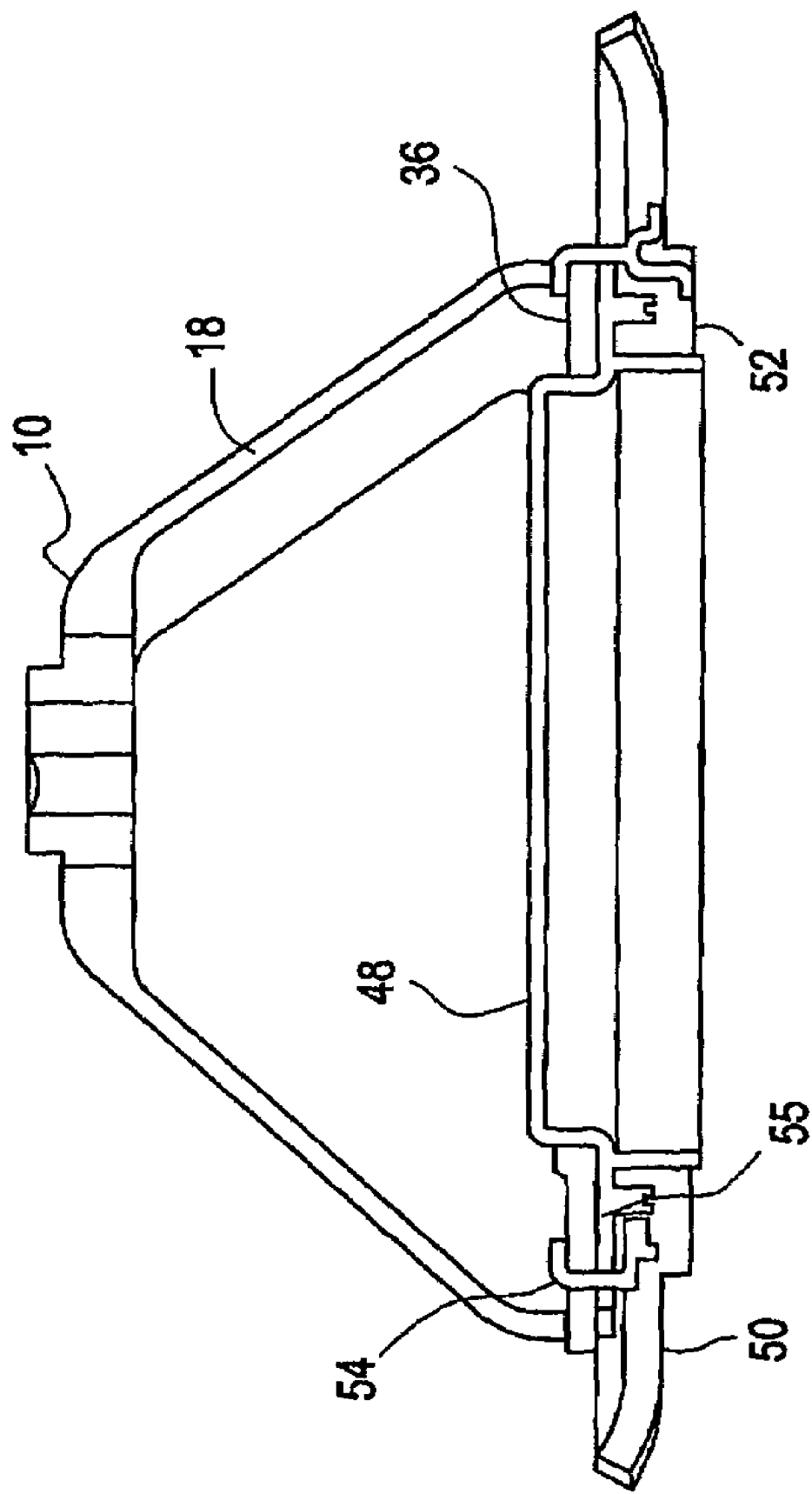
FIG. 4 is a cross-sectional view of a tool in connection with a lock ring in a fuel sender closure system.

The lock ring 36 is designed to retain the MRA 48 against a fuel tank shell 50 as depicted, for instance, in FIG. 4. A portion of the MRA 48 is seated onto seal 52 and through an opening located in the fuel tank shell 50. An outer lip portion 55 of the MRA is seated onto a seal 52. The lip portion 55 prevents the MRA from completely entering the fuel tank opening.

Figure 9A:
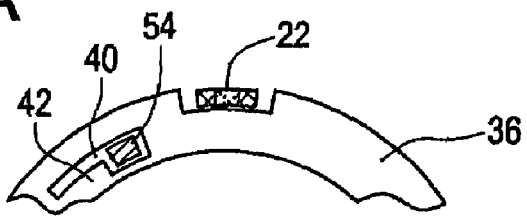
FIG. 9A is a top view of a tool in a loaded unlocked position with respect to a portion of a lock ring and a coupling mechanism.

To assemble the MRA 48 to the fuel tank opening, the lock ring 36 is placed over the MRA 48 such that the lock ring 36 rests atop of the outer lip portion 55 of the MRA 48. E-rings 54, protruding from the fuel tank shell 50, pass through lock ring cutouts 22 and serve to act as a coupling mechanism for retaining the lock ring 36 to the fuel tank assembly. The tool 10 is positioned such that the feet 22 are placed within respective lock ring notches 38 as shown in FIG. 3. FIG. 9A shows a top view of the foot 22 positioned within a lock ring notch 38. This position is referred to as a "loaded unlocked position". In the loaded unlocked position, the E-rings 54 merely pass through the lock ring cutout 22 as shown in FIGS. 5 and 9A.

Figure 6:
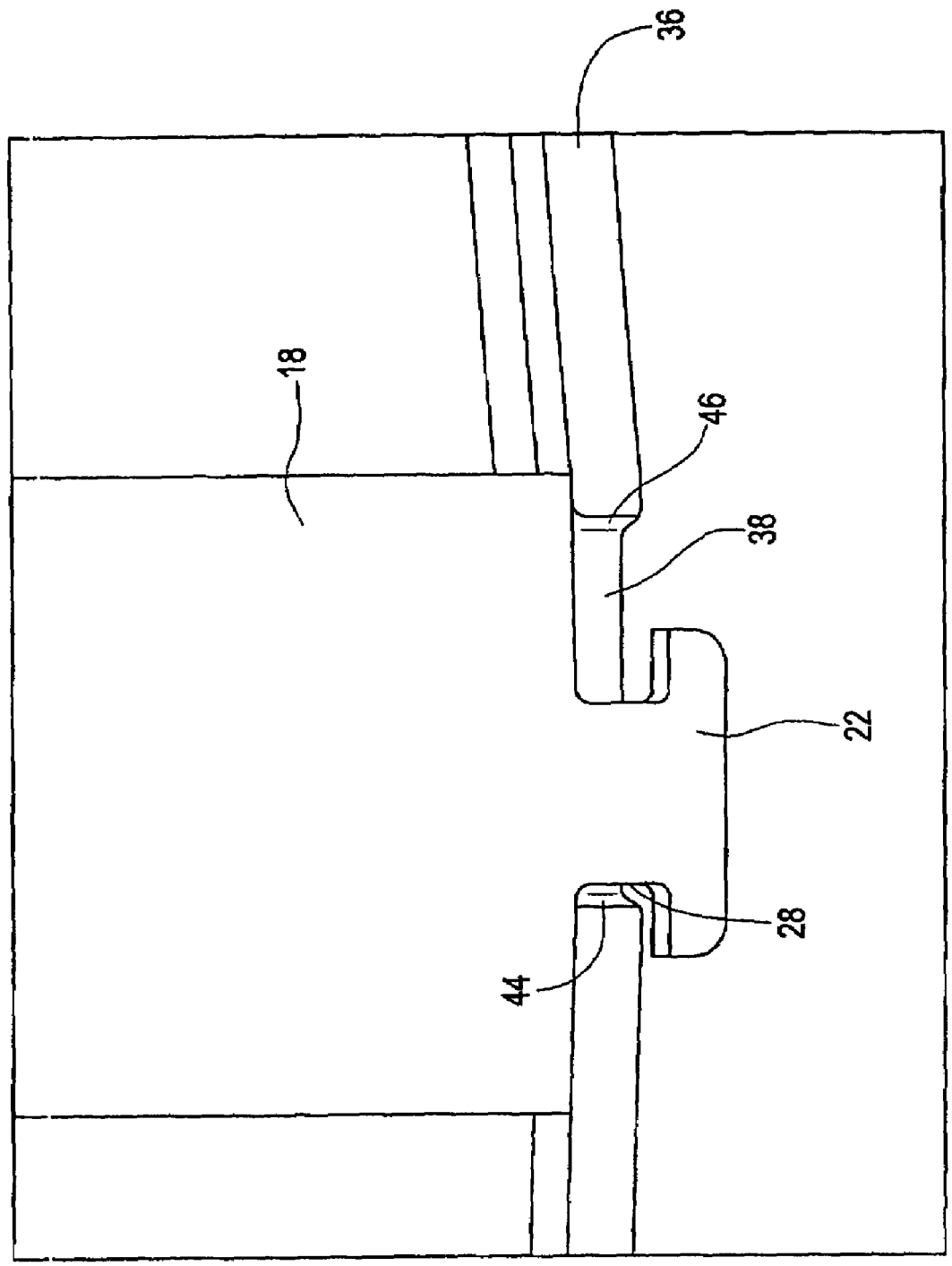
FIG. 6 is an enlarged view of the leg and foot of the tool in a position to rotate a lock ring clockwise.
Figure 9B:
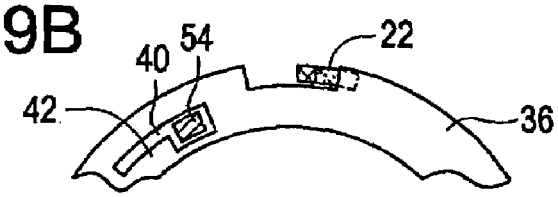
FIG. 9B is a top view of a tool in a first engaged unlocked position with respect to a portion of a lock ring and a coupling mechanism.

The process of actually retaining the MRA 48 against the fuel tank opening begins with rotating the tool 10 to what is referred to as a "first engaged unlocked position". In the first engaged unlocked position, the tool 10 is slightly turned clockwise such that the first notch 28 of the tool 10 abuts the left sidewall 44 of the lock ring notch 38 as shown in FIG. 6. In the first engaged unlocked position, the E-rings 54 are still located in the lock ring cutout 40 as shown in FIG. 9B.

Figure 9C:
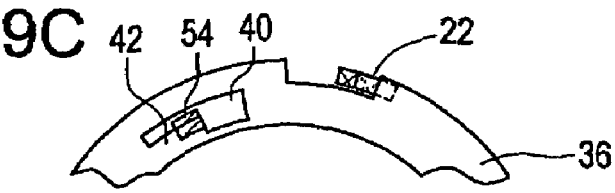
FIG. 9C is a top view of a tool in a first engaged locked position with respect to a portion of a lock ring and a coupling mechanism.

In order to fully retain the MRA 48 against the fuel tank opening, the tool 10 is further rotated clockwise. Because the first notch 28 of the tool 10 already abuts the left sidewall 44 of the locking notch 38, the lock ring 36 is also rotated when the tool 10 rotates. This causes the E-ring 54 to lock onto the retainer flange 42 of the lock ring 36 (see FIG. 7). This position is referred to as a "first engaged locked position" as shown in FIG. 9C. The shape of the crimped formation in the retainer flange 42 coincides with a matching shape of the inner surface of the E-ring 54. Thus the complementary shapes of the retainer flange 42 and the E-ring 54 retain these elements against movement relative to each other to some degree when engaged.

Figure 9D:
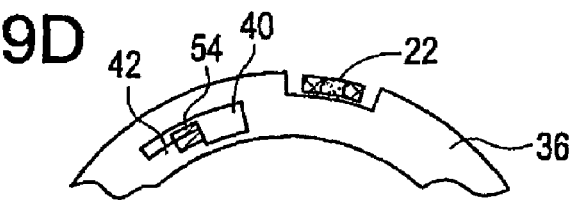
FIG. 9D is a top view of a tool in locked loaded position with respect to a portion of a lock ring and a coupling mechanism.

In order to remove the tool 10 from the first engaged locked position, the tool 10 is rotated counterclockwise such that neither of the first and second notches 28, 30 abut either sidewall of the lock ring tool notch 38. In this position, referred to as a "locked loaded position", as shown in FIG. 9D, the E-rings remain locked onto the retainer flange 42. Once the tool 10 is in the locked loaded position, it may be lifted upwardly such that the feet 22 clear the notches 38 and the tool 10 can be removed.

Figure 8:
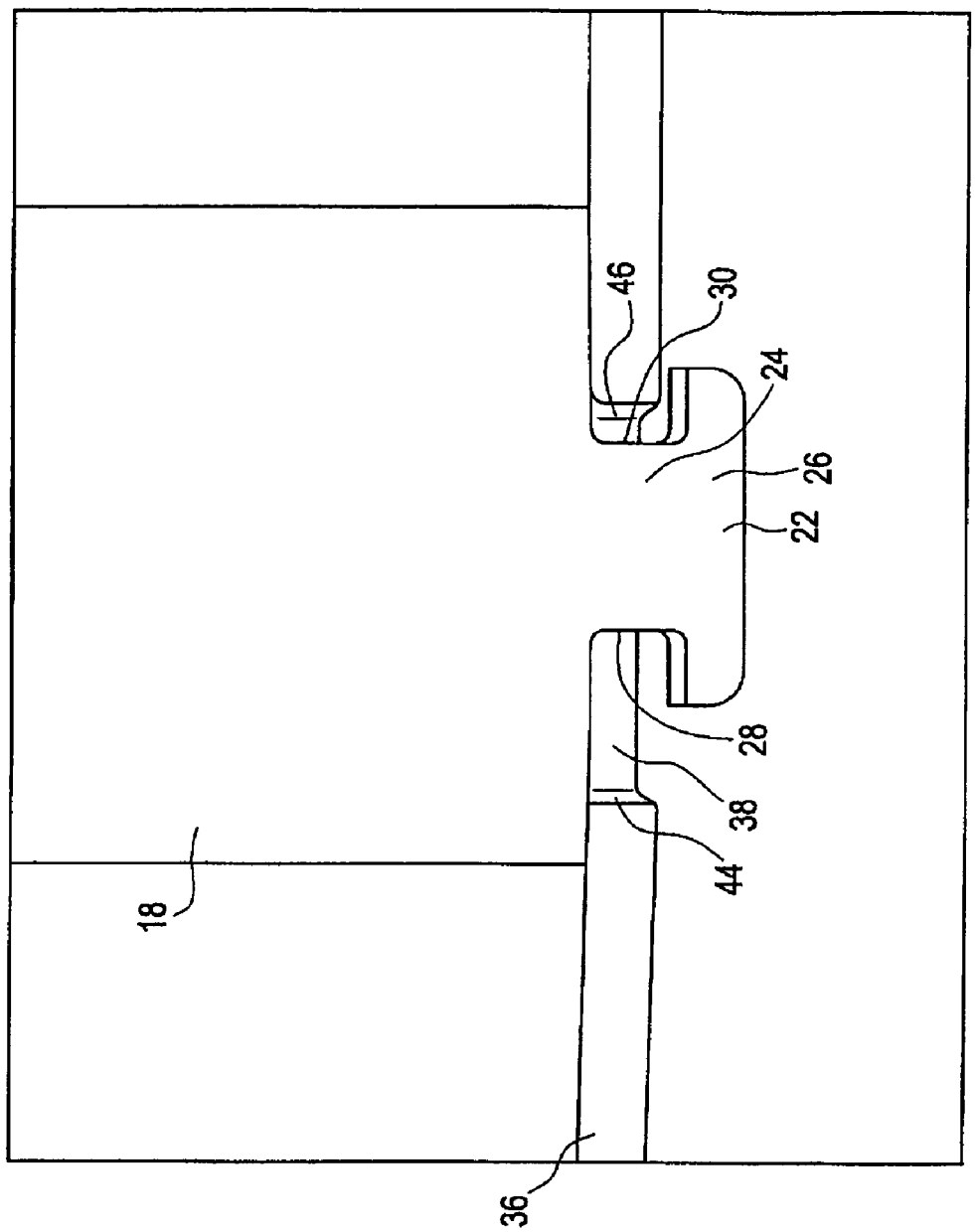
FIG. 8 is an enlarged view of the leg and foot of the tool in a position to rotate a lock ring counter-clockwise.
Figure 9E:
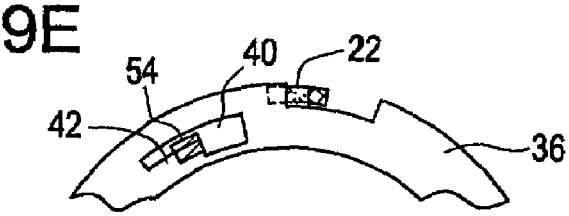
FIG. 9E is a top view of a tool in a second engaged locked position with respect to a portion of a lock ring and a coupling mechanism.

In order to disassemble a locked MRA 48 from the fuel tank assembly, the tool 10 is placed in the locked loaded position as depicted in FIG. 9D. Once the first and second notches 28, 30 are generally aligned with the lock ring's notch 38, the tool 10 is slightly turned counter-clockwise. The tool 10 will move into what is referred as a "second engaged locked position" wherein the second notch 30 of the tool's foot 22 is abutted against the right side wall 46 of the lock ring notch 38 as shown in FIG. 8. In the second engaged locked position, the E-Ring 54 has not yet been unlocked from the flange 42, as shown in FIG. 9E.

Figure 9F:
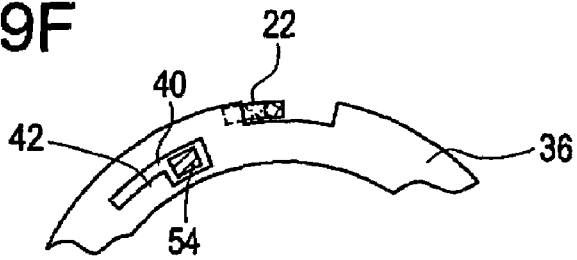
FIG. 9F is a top view of a tool in a second engaged unlocked position with respect to a portion of a lock ring and a coupling mechanism.

In order to unlock the lock ring 36, the tool 10 is additionally urged to rotate it in the counter-clockwise direction. This in turn, urges the lock ring 36 to rotate in the same counter-clockwise direction causing the E-ring 54 to unlock off of the retainer flange 42 and travel into the lock ring cutout 40. The position wherein second notch 30 of the foot 22 is abutted against the right side wall 46 of the lock ring notch 38, and the E-ring 54 located in the lock ring cutout 40, is referred to as a "second engaged unlocked position" further shown in FIG. 9F.

In the second engaged unlocked position, the lock ring 36 may be lifted up by the tool 10 when the second notch 30 is abutted against the right side wall 46 of the lock ring notch 38 and the E-rings 54 are clear the lock ring cutouts 40.

Figure 9G:
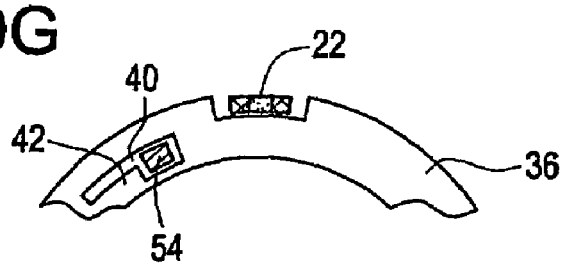
FIG. 9G is a top view of a tool in a second loaded unlocked position with respect to a portion of a lock ring and a coupling mechanism.

The tool 10 may be removed from the lock ring 36 by slightly rotating it clockwise, thus achieving a second loaded unlocked position as shown in FIG. 9G. In the second loaded unlocked position, the feet 22 are positioned entirely within respective lock ring notches 38 and the E-rings 54 are entirely located within the lock ring cut outs 40. It will be appreciated that the first loaded unlocked position and the second loaded unlocked position are the same. The front loaded unlocked position is described as a start point for installing a ring; and the second loaded unlocked position is described as an end point for removing a ring.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, it should be readily understood that specific kinds of connection features, reinforcement features and/or coupling mechanisms provided above are exemplary and should not be viewed as limiting the invention. Other connection/reinforcement features and/or coupling mechanism may also be utilized in the installation and removal procedure of this invention.

What is claimed:

1. A device for removing or installing a lock ring, comprising:
    a base;
    a drive connection feature; and
    a rigid plurality of legs extending downwardly and outwardly from said base, each of the legs terminating in a respective end having a respective foot wherein said legs and said base are in direct unitary connection with each other, wherein each foot further comprises a foot base and a top head connected to each leg end, wherein the foot base is thinner than the leg end and at least part of the top head is wider than the foot base to define a first notch and a second notch defined between the leg end and the top head.

2. The device of claim 1, wherein the drive connection feature is located on the base.

3. The device of claim 2, wherein the drive connection feature is a wrench connection opening.

4. The device of claim 2, further comprising:
    a reinforced feature that reinforces the drive connection feature.

5. The device of claim 4, wherein the reinforcement feature is a stiffening ring.

6. The device of claim 2, wherein the connection feature is a square drive opening.

7. The device of claim 1, wherein the foot base is integral with the top head.

8. The device of claim 1, wherein the base, the connection feature, the plurality of legs and the foot extending from each of said legs are all integral with each other.

9. The device of claim 1, wherein the tool has sufficient strength to support an application load of at least 500 ft/lbs.

10. The device of claim 1, wherein the tool has sufficient strength to support an application load of at least 400 ft/lbs. at 30 degrees per second.

11. The device of claim 1, wherein the legs extend outwardly at an obtuse angel from the base.

12. A device for removing or installing a lock ring comprising:
    a base;
    means for connecting the base to a drive device; and
    a plurality of rigid means for engaging extending downwardly and outwardly from said base, each of the engaging means terminating in a respective end having a respective means for supporting, wherein said engaging means and said base are in direct unitary connection with each other, wherein each foot further comprises a foot base and a top head connected to each leg end, wherein the foot base is thinner than the leg end and at least part of the top head is wider than the foot base to define a first notch and a second notch defined between the leg ends and the top head.

13. The device of claim 12, further comprising:
a means for reinforcing the connecting means.

14. The device of claim 13, wherein the reinforcing means is a stiffening ring.

15. The device of claim 12, wherein the connecting means is a wrench connection opening.

16. The device of claim 15, wherein the wrench connection opening is a square drive opening.

17. The device of claim 12, wherein the base, connecting means and engaging means are integral with each other.

18. The device of claim 12, wherein the engaging means comprises:
a plurality of legs extending from said base, each of the legs terminating in a respective end.

19. The device of claim 18, wherein the supporting means comprises:
a respective foot located on each respective leg end.

20. The device of claim 12, wherein the engaging means extends outwardly at an obtuse angle from the base.

* * * * *